Patented Aug. 16, 1927.

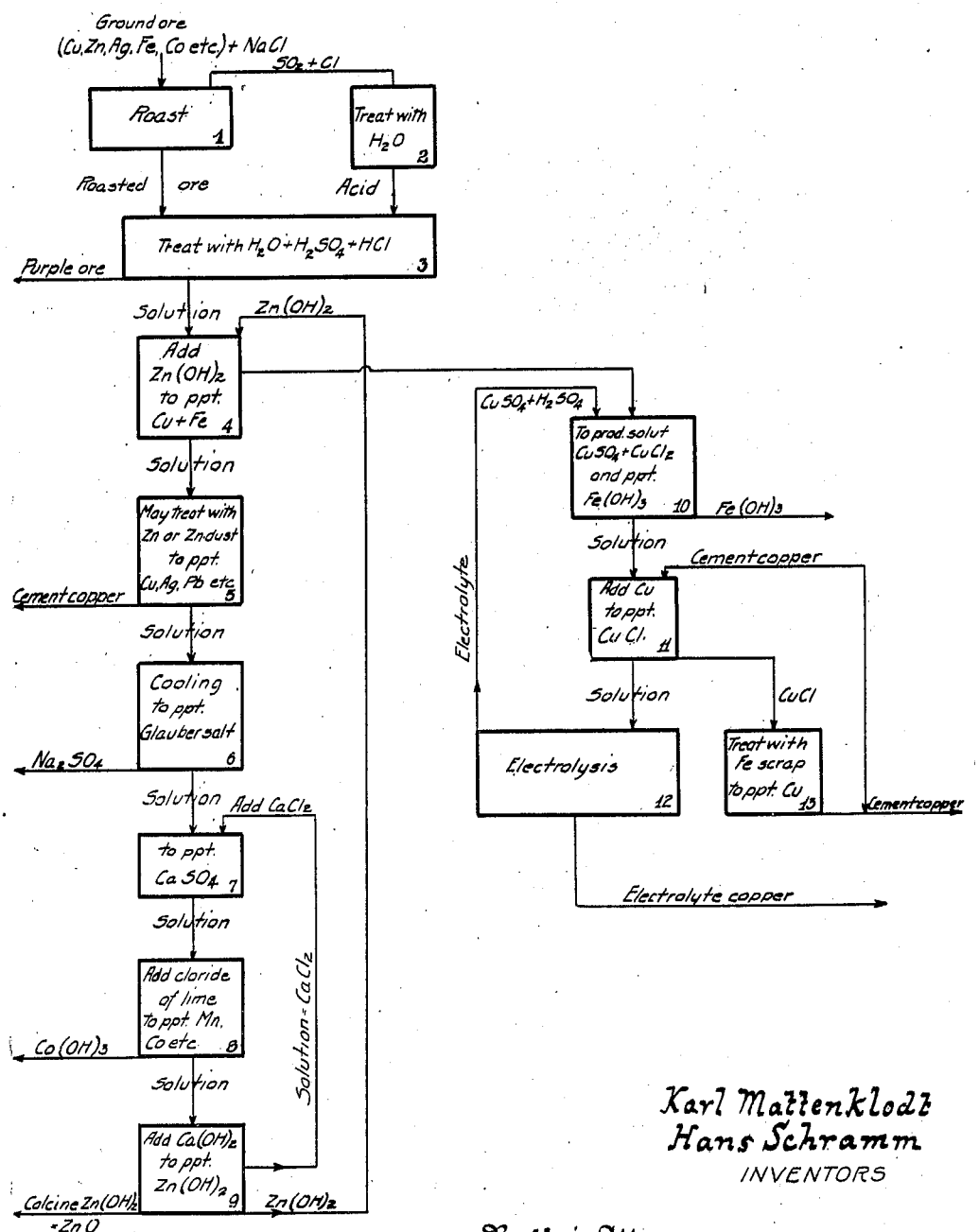

1,639,610

UNITED STATES PATENT OFFICE.

KARL MATTENKLODT AND HANS SCHRAMM, OF DUISBURG, GERMANY, ASSIGNORS TO DUISBURGER-KUPFERHUTTE, OF DUISBURG, GERMANY, A CORPOROATION OF GERMANY.

RECOVERY OF COPPER, ZINC, AND OTHER METALS FROM SOLUTIONS CONTAINING CHLORIDES AND SULPHATES.

Application filed November 17, 1926, Serial No. 149,010, and in Germany April 9, 1925.

According to the usual method for the recovery of copper from solutions containing chlorides and sulphates such as result for example in the chlorinating roasting of burnt pyrites, the copper is precipitated in the metallic form by means of iron, generally iron-chips, together with the bulk of the precious metals such as gold and silver. In this process which is known as "cementation", more iron is dissolved by the solution than is equivalent to the amount of copper precipitated. From the solutions obtained by the said cementation process, hitherto only the Glauber's salt contained therein has been recovered by cooling, while all other metals, namely zinc, iron, cobalt, nickel and others were lost by draining off the waste liquors. It has been proposed to recover and separate the various metals by precipitation or reduction by means of sulphureted hydrogen or other gases, or by precipitation by means of carbonates or basic salts of the alkali metals, alkaline earth metals or heavy metals, but none of these methods has proved satisfactory when working on an industrial scale. It has also been proposed to precipitate the copper by means of zinc hydroxid obtained in a previous operation, but with the methods hitherto proposed other valuable components of the solutions such as the precious metals and Glauber's salt, are lost.

Now we have invented a process which is workable on an industrial scale without difficulty and renders it possible to recover practically all components of the solution without draining off any substantial amount thereof. The process according to our present invention is carried out in a circular system by employing part of the products obtained, as precipitating agents in a new operation.

According to our invention which is shown on a drawing setting forth a flow sheet a solution containing copper and other metal salts in the presence of chlorides and sulphates, such for example as is obtained by leaching burnt pyrites after a chlorinating roasting, is first treated with zinc hydroxid which is obtained as hereinafter described, whereby the copper and also iron, if any be present in the solution, are precipitated as hydroxids. The remaining solution is freed from the bulk of sodium sulphate by strongly cooling or by adding suitable salts such as alkali metal chlorides or by both means, whereupon it is treated with calcium chloride solution obtained in a previous operation in the course of the process which appears from the accompanying flow sheet for precipitating the rest of the sulphur in the form of calcium sulphate. After separation from the calcium sulphate, the solution which is now free from sulphates is treated with calcium hydroxid in order to precipitate the zinc, if desired after the small quantities of copper, cobalt, nickel and the precious metals have been removed from the solution for example by a treatment with zinc, zinc dust, or calcium hypochlorite or other suitable agent. Part of the zinc hydroxid is employed in a new operation for the precipitation of copper, while the rest of it may be employed for example for the production of metallic zinc, zinc white, lithopone or the like. The remaining calcium chloride solution is employed for precipitating the sulphur in a subsequent operation in the manner described above.

It is very advantageous to carry out the precipitation of copper by means of zinc hydroxid in two or more stages. In this case, only so much zinc hydroxid is added to the solution in the first stage as to precipitate only part of the copper, which is filtered off; thereupon the rest of the copper is precipitated in one or several subsequent stages by adding an excess of zinc hydroxid. After separation of the precipitate, the small quantity of copper still contained in the solution and the bulk of the silver, cobalt and nickel may be precipitated by means of zinc or zinc dust or other more basic metals than those to be precipitated. This precipitate is worked up to copper, silver, gold, cobalt and nickel by any suitable method.

Instead of precipitating the cobalt, nickel and the precious metals in one stage, the process can be carried out in two stages. This can be effected, for instance, by precipitating the copper as indicated before by means of zinc hydroxide then treating with zinc or zinc dust to precipitate small quantities of copper and the precious metals for instance, the silver contained in the solution. The precipitation of the cobalt in this case can be effected after the sodium sulphate and the calcium sulphate have been precipitated by adding chloride of lime.

The copper precipitates obtained in the second and further stages of the process, which are rich in zinc hydroxid, are preferably employed for the precipitation of copper from fresh solutions. The copper precipitate obtained in the first stage is dissolved in such quantities of sulphuric acid or of exhausted acid electrolyte resulting from the electrolytic production of copper as to leave undissolved any hydroxids of metals which by basic precipitating agents would be precipitated prior to copper such for example as trivalent iron. After filtering, the solution is freed from chlorine ions by agitating or stirring with finely divided metallic copper, whereby the cupric chloride is converted into difficultly soluble cuprous chloride which is removed by filtration. The purified copper sulphate solution is ready for electrolysis directly or after proper dilution with exhausted electrolyte. The cuprous chloride is converted into metallic copper by treatment with iron-chips; part of the precipitated copper may be employed in a later operation for removing chlorine ions while the rest is refined in the usual manner. The removal of chlorine ions may also be effected in any other suitable manner.

The process according to the present invention allows for the first time of working up roasted pyrites in a simple manner with a separate recovery of all valuable constituents. In comparison with the methods hitherto known, in which zinc hydroxid and calcium hydroxid are employed for the precipitation of copper and zinc and in which the ore is leached with calcium chloride solutions in order to avoid trouble in the precipitation of copper and zinc by a simultaneous precipitation of calcium sulphate, the present process is superior in that the roasted pyrites can be leached with water or acids, so that a valuable iron ore not only practically free from salts of heavy metals, but also from sulphates and directly ready for working up in blast furnaces is obtained. In practice it is also an important advantage that in the present process the first copper precipitate is very low in zinc and that the zinc precipitate is free from calcium sulphate; the bulk of sulphate is not lost in the form of calcium sulphate, but is obtained in the form of valuable sodium sulphate or Glauber's salt. Practically the only precipitating agent introduced into the process is calcium hydroxid, as all other precipitating agents such as zinc hydroxid and calcium chloride are obtained in the course of the operation and can be employed directly in subsequent operations. In comparison with the usual cementation process, the present process has the great advantage that instead of the valuable iron-chips which, moreover, were drained off together with the zinc, cheap lime is employed.

The valuable results obtained by our present process will be further illustrated by the following figures: The solution to be treated contained about 3 per cent of copper, 3 per cent of zinc, 4 per cent of sulphur, 8 per cent of chlorine and 0.5 per cent of iron. By treatment with a copper precipitate containing zinc hydroxid obtained in a previous operation in the course of the process which appears from the accompanying flow sheet, a precipitate containing, when dry, 40 per cent of copper, 2 per cent of zinc and 8 per cent of iron was obtained. The remaining solution containing 0.5 per cent of copper, 5.5 per cent of zinc, 3.8 per cent of sulphur, 7.5 per cent of chlorine and traces of iron, was treated with an excess of zinc hydroxid, whereby a precipitate containing, when dry, 8 per cent of copper, 30 per cent of zinc and traces of iron was obtained. The solution which contained 0.005 per cent of copper, 5.8 per cent of zinc, 3.6 per cent of sulphur and 7.4 per cent of chlorine and was free from iron, was freed from the rest of the copper by treatment with zinc dust, whereupon Glauber's salt was precipitated by cooling and adding common salt. The sodium sulphate was filtered off and the remaining solution containing 6 per cent of zinc, 1 per cent of sulphur and 12 per cent of chlorine treated with calcium chloride solution. After filtering off the calcium sulphate the solution contained 3.3 per cent of zinc, 0.1 per cent of sulphur and 11 per cent of chlorine. It was then treated with calcium hydroxid, whereby practically all zinc was precipitated. The waste liquor was free from copper, iron and sulphur and contained only traces of zinc and 10 per cent of chlorine. It was utilized in a new operation for the precipitation of calcium sulphate.

We claim:

1. The process of recovering copper, zinc and other metals from solutions containing such metals in the presence of chlorides and sulphates, which consists in precipitating the copper by means of zinc hydroxid obtained in a previous operation, separating sodium sulphate from the solution, adding so much calcium chloride solution obtained in a previous operation as to precipitate the remainder of sulphur, and precipitating zinc hydroxid from the remaining solution by means of calcium hydroxid.

2. The process of recovering copper, zinc and other metals from solutions containing such metals in the presence of chlorides and sulphates, which consists in precipitating the copper by means of zinc hydroxid obtained in a previous operation, freeing the solution from the rest of copper and from other heavy and precious metals by treatment with a more basic metal than those to be precipitated, removing sodium sulphate from the solution, adding so much calcium chloride solution obtained in a previous operation as to precipitate the sulphur, and precipitating zinc hydroxid from the remaining solution by means of calcium hydroxid.

3. The process of recovering copper, zinc and other metals from solutions containing such metals in the presence of chlorides and sulphates, which consists in precipitating part of the copper by means of zinc hydroxid obtained in a previous operation, precipitating from the remaining solution the rest of the copper by an excess of zinc hydroxid, removing sodium sulphate from the solution, adding so much calcium chloride solution obtained in a previous operation as to precipitate the sulphur and precipitating zinc hydroxid from the remaining solution by means of calcium hydroxid.

4. The process of recovering copper, zinc and other metals from solutions containing such metals in the presence of chlorides and sulphates, which consists in precipitating part of the copper by means of a copper precipitate rich in zinc hydroxide obtained in a previous operation, precipitating the rest of the copper by means of zinc hydroxid obtained in a previous operation, removing sodium sulphate from the solution, adding so much calcium chloride solution obtained in a previous operation as to precipitate the sulphur, and precipitating zinc hydroxid from the remaining solution by means of calcium hydroxid.

5. The process of recovering copper, zinc and other metals from solutions containing such metals in the presence of chlorides and sulphates, which consists in precipitating part of the copper by means of zinc hydroxid obtained in a previous operation, precipitating from the remaining solution the rest of the copper by an excess of zinc hydroxid, removing sodium sulphate from the solution, adding so much calcium chloride solution obtained in a previous operation as to precipitate the sulphur, and precipitating zinc hydroxid from the remaining solution by means of calcium hydroxid and dissolving the copper precipitate resulting from the first precipitation in such quantities of sulphuric acid as to leave undissolved such metal hydroxids which by basic precipitating agents would be precipitated prior to copper.

In testmony whereof we have hereunto set our hands.

KARL MATTENKLODT.
HANS SCHRAMM.